United States Patent
Hoshika

(10) Patent No.: US 11,437,073 B2
(45) Date of Patent: Sep. 6, 2022

(54) IMAGE PROCESSING APPARATUS CAPABLE OF PROPERLY EDITING MOVING IMAGE FILE, IMAGE CAPTURE APPARATUS, IMAGE PROCESSING METHOD, AND STORAGE MEDIUM

(71) Applicant: CANON KABUSHIKI KAISHA, Tokyo (JP)

(72) Inventor: Hiroyuki Hoshika, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 16/829,436

(22) Filed: Mar. 25, 2020

(65) Prior Publication Data
US 2020/0312369 A1 Oct. 1, 2020

(30) Foreign Application Priority Data

Mar. 26, 2019 (JP) .............................. JP2019-058726

(51) Int. Cl.
*G11B 27/031* (2006.01)
*G11B 27/10* (2006.01)

(52) U.S. Cl.
CPC ............ *G11B 27/031* (2013.01); *G11B 27/10* (2013.01)

(58) Field of Classification Search
None
See application file for complete search history.

(56) References Cited

U.S. PATENT DOCUMENTS

| | | | |
|---|---|---|---|
| 7,110,025 B1* | 9/2006 | Loui | H04N 21/8153 348/220.1 |
| 9,263,089 B2* | 2/2016 | Abe | G11B 27/005 |
| 2007/0071405 A1* | 3/2007 | Choi | G11B 27/10 386/239 |
| 2018/0152662 A1* | 5/2018 | Takahashi | H04N 5/23245 |

FOREIGN PATENT DOCUMENTS

JP 2008-166889 A 7/2008

\* cited by examiner

*Primary Examiner* — Heather R Jones
(74) *Attorney, Agent, or Firm* — Cowan, Liebowitz & Latman, P.C.

(57) ABSTRACT

An image processing apparatus capable of properly editing a moving image file including imaging information items recorded at different recording periods. The image processing apparatus executes an editing process on a moving image file in which a moving image including frames arranged in time-series and imaging information associated with the moving image have been recorded. The imaging information has a data structure in which long period imaging information recorded at a first period in the time series and short period imaging information recorded at a second period shorter than the first period in the time series are arranged. A system controller executes the editing process such that a frame having the long period imaging information becomes a first frame in the moving image file having been edited.

15 Claims, 7 Drawing Sheets

IMAGE PROCESSING APPARATUS CAPABLE OF PROPERLY EDITING MOVING IMAGE FILE, IMAGE CAPTURE APPARATUS, IMAGE PROCESSING METHOD, AND STORAGE MEDIUM

BACKGROUND OF THE INVENTION

Field of the Invention

The present invention relates to an image processing apparatus that edits a moving image file, an image capture apparatus equipped with the image processing apparatus, an image processing method, and a storage medium.

Description of the Related Art

In recent years, with regard to imaging of a moving image, imaging information obtained during imaging is added to a unit image (frame) forming the moving image and recorded in a moving image file. Further, the imaging information added to the moving image is analyzed, whereby a point of interest (highlight) included in the moving image is detected.

Further, in Japanese Laid-Open Patent Publication (Kokai) No. 2008-166889, there has been proposed, with regard to editing of a moving image file, a technique of recording positional information of a GOP (Group Of Pictures) corresponding to an editing point of the moving image and a frame number in the GOP, in management information. With this configuration, the edited moving image file can be reproduced from the editing point by using both of the positional information of the GOP and the frame number.

The imaging information added to a moving image includes a plurality of types of information, such as object information and block integration information. In general, the block integration information is larger in information amount than the object information. To reduce data volume of a moving image file, there is sometimes adopted a configuration in which the recording period of information having more information amount (such as the block integration information) is made longer than the recording period of information having less information amount (such as the object information). Further, it is preferable that the data format has a data structure in which the imaging information is fixed so as to make the imaging information applicable to various analyses, such as highlight detection.

When a moving image file is edited to extract part of the moving file in which a plurality of types of imaging information, acquired at different recording periods, have been recorded, if the frames and the imaging information within the extracted time period are stored in a new moving image file, there is a possibility that the stored imaging information is improperly arranged.

SUMMARY OF THE INVENTION

The present invention provides an image processing apparatus capable of properly editing a moving image file including imaging information items recorded at different recording periods, an image capture apparatus, an image processing method, and a storage medium.

In a first aspect of the present invention, there is provided an image processing apparatus that executes an editing process on a moving image file in which a moving image including a plurality of frames arranged in a time series and imaging information associated with the moving image are recorded, wherein the imaging information has a data structure in which long period imaging information recorded at a first period in the time series and short period imaging information recorded at a second period shorter than the first period in the time series are arranged, the image processing apparatus comprising a controller configured to execute the editing process such that a frame having the long period imaging information becomes a first frame in the moving image file having been edited.

In a second aspect of the present invention, there is provided an image capture apparatus comprising an image capture device used for acquiring image data forming a plurality of frames which are included in a moving image and arranged in time series, and the image processing apparatus.

In a third aspect of the present invention, there is provided an image processing method for editing a moving image file in which a moving image including a plurality of frames arranged in a time series and imaging information associated with the moving image are recorded, wherein the imaging information has a data structure in which long period imaging information recorded at a first period in the time series and short period imaging information recorded at a second period shorter than the first period in the time series are arranged, the method comprising editing the moving image file such that a frame having the long period imaging information becomes a first frame in the moving image file having been edited.

According to the present invention, it is possible to properly edit a moving image file including imaging information items recorded at different recording periods.

Further features of the present invention will become apparent from the following description of exemplary embodiments (with reference to the attached drawings).

BRIEF DESCRIPTION OF THE DRAWINGS

FIGS. 7A to 7D are diagrams useful in explaining time-series correspondence between an image and imaging information in a second editing process and a third editing process which are variations of the first editing process.

DESCRIPTION OF THE EMBODIMENTS

The present invention will now be described in detail below with reference to the accompanying drawings showing embodiments thereof. The following description is given only of one example of possible configurations capable of embodying the present invention. The embodiment described hereafter can be changed or modified according to the configuration of an apparatus to which the present invention is applied and various conditions as required. Therefore, the configuration described below is by no means intended to limit the scope of the present invention. An image processing apparatus according to the following embodiment can be applied not only to a digital camera, described hereinafter, but also to various electronic camera apparatuses, such as a monitoring camera, an industrial camera, and a medical camera. The image processing apparatus according to the following embodiment can also be applied to various information processing apparatuses, such as a smartphone and a tablet terminal. Further, part of the image processing apparatus according to the following embodiment, concerning moving image editing, can be applied to an apparatus having no image capture function, such as a personal computer.

Figure 1:
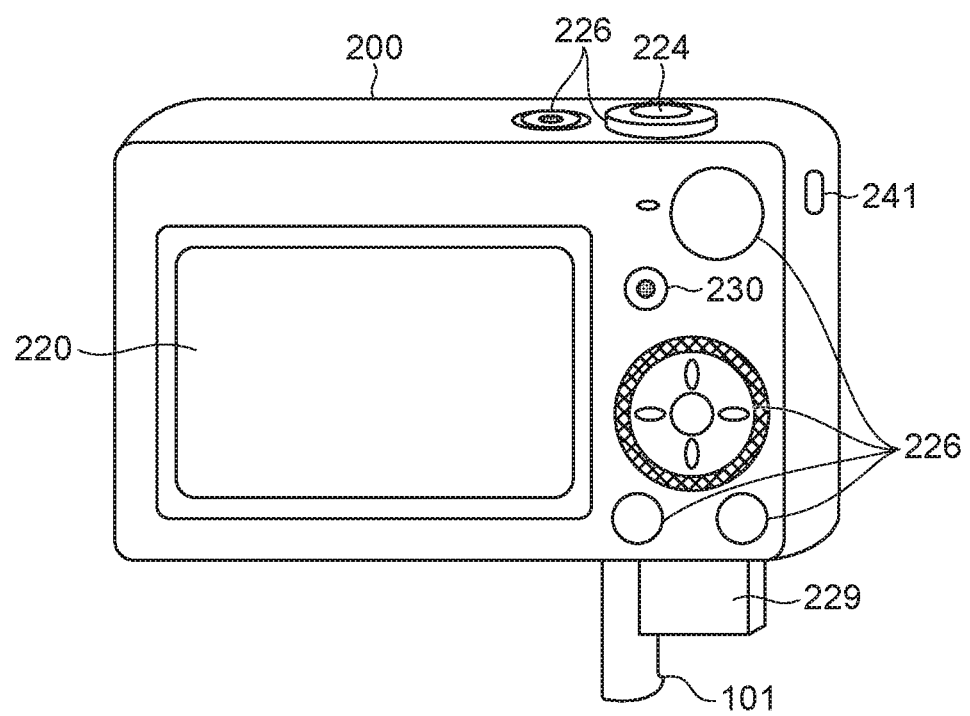
FIG. 1 is a perspective view of the appearance of a digital camera as an image processing apparatus according to an embodiment of the present invention.

FIG. 1 is a perspective view of the appearance of a digital camera 200 as an example of the image processing apparatus according to the embodiment. The digital camera 200 includes a cover 101, a display section 220, a shutter button 224, an operation section 226, an external storage medium 229, a moving image-photographing button 230, and a signal output section 241.

The display section 220 is a display member for displaying an image and various information, which is implemented e.g. by a TFT (Thin Film Transistor) liquid crystal display. The shutter button 224 is an operation member used by a user for instructing photographing a still image. The moving image-photographing button 230 is an operation member used by a user to instruct capturing a moving image. In the present embodiment, the moving image is formed by a plurality of unit images (frames) arranged in time series. The operation section 226 is an operation member for receiving various operations input by a user to the digital camera 200. The operation section 226 includes operation members, such as a power switch for switching between a power-on state and a power-off state, a mode switching switch for switching between various modes, a menu button for designating menu options, and a cross key button for selecting various settings and instructions. Note that the display section 220 and the operation section 226 may be integrally formed by a member capable of performing display and input, such as a touch panel. Further, the operation section 226 may have a pointing device using line-of-sight detection and a voice recognition device.

The external storage medium 229 is a storage medium which can be attached and removed to and from the digital camera 200, and for example, a memory card or a hard disk drive can be used. By closing the cover 100, the external storage medium 229 is accommodated in the digital camera 200. The signal output section 241 is an interface for displaying an image stored in the digital camera 200 on an external display device, such as a TV monitor.

Figure 2:
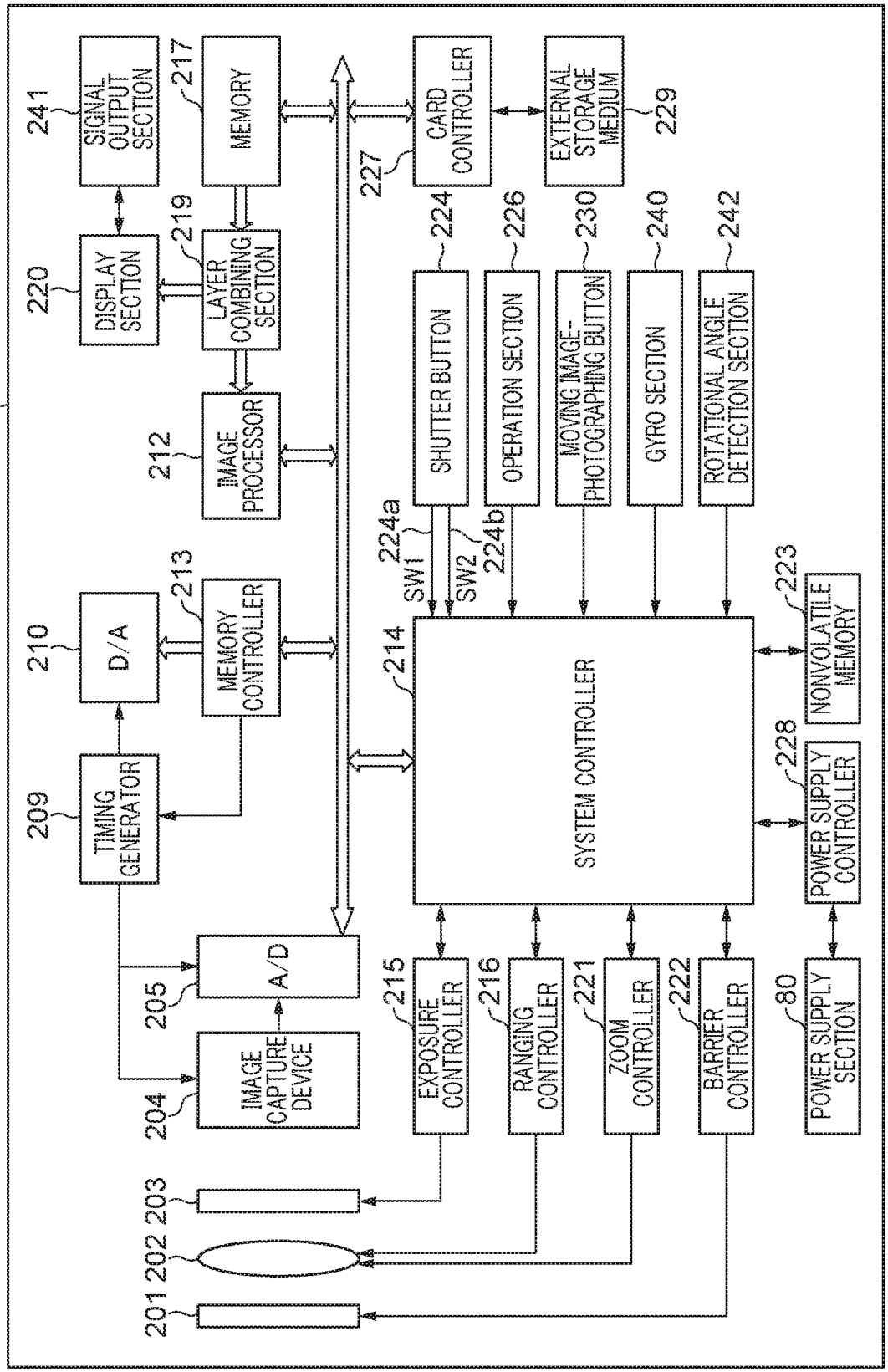
FIG. 2 is a block diagram of the digital camera.

FIG. 2 is a block diagram of the digital camera 200 according to the embodiment of the present invention.

A photographic lens 202 is a lens group including a focus lens and a zoom lens. A barrier 201 is protecting means for covering an image capture system including the photographic lens 202 to thereby prevent the image capture system from becoming dirty or being broken. The image capture system may be formed integrally with the digital camera 200 or may be removably attached to the digital camera 200. A shutter 203 is a shutter having a diaphragm function.

An image capture device 204 is a solid-state image sensor including a CCD or CMOS sensor which converts an incident optical image to electrical signals. An analog-to-digital converter 205 is a conversion circuit for converting analog signals output from the image capture device 204 to digital signals (image data). A timing generator 209 is a timing generation circuit for supplying a clock signal and a control signal to devices, such as the image capture device 204, the analog-to-digital converter 205, and a digital-to-analog converter 210.

An image processor 212 is a logical circuit for executing various image processing processes. The image processor 212 executes image processing, such as development processing, face detection processing, object detection processing, and block integration information acquisition processing, on image data output from the analog-to-digital converter 205 or image data supplied from a memory controller 213. For example, the image processor 212 detects a face of an object person included in image data according to a predetermined face detection algorithm to thereby acquire face information, such as face detection information indicating e.g. the orientation and the size of a face and face coordinate information indicating the position of the face in the image data. Further, the image processor 212 integrates an object luminance of each of a plurality of areas (each block) obtained by dividing the image data to thereby acquire block integration information indicating a block luminance integrated value.

Further, the image processor 212 executes predetermined calculation processing, such as correlation calculation processing, using captured image data, and outputs a result of the calculation to a system controller (controller) 214. The image processor 212 reads image data stored in a memory 217, executes compression or decompression processing on the image data, and writes the processed data in the memory 217. As the compression/decompression method, it is possible to use, for example, a JPEG method or a MPEG-4 AVC/H.264 method. The image processor 212 can acquire a point of interest (highlight) included in a moving image by analyzing imaging information PI (object information, block integration information, camera operation information, etc.) acquired when the moving image is photographed.

The memory 217 is a storage medium capable of storing photographed still images and moving images, and has a sufficient storage capacity to store a predetermined number of still images and a predetermined time period of moving images. Further, the memory 217 is also used as a work area (working memory) for the system controller 214. A nonvolatile memory 223 is an electrically recordable and erasable nonvolatile memory, and is e.g. an EEPROM (Electrically Erasable Programmable Read-Only Memory). The nonvolatile memory 223 stores control programs used by the system controller 214, etc., and various character information, etc.

The memory controller 213 is a control circuit for controlling the analog-to-digital converter 205, the timing generator 209, the digital-to-analog converter 210, the image processor 212, and the memory 217. Image data obtained by the analog-to-digital converter 205 converting an output from the image capture device 204 is written into the memory 217, after being processed by the image processor 212, via the memory controller 213, or directly via the memory controller 213. Note that the memory controller 213 may control the nonvolatile memory 223, and may control the external storage medium 229 via a card controller 227.

The card controller 227 executes transmission and reception (reading and writing) of data to and from the removable external storage medium 229.

The system controller 214 is a control circuit for comprehensively controlling the components of the digital camera 200, and is implemented e.g. by one or more CPUs (Central Processing Units). The system controller 214 controls the components of the digital camera 200 by loading the programs stored in the nonvolatile memory 223 into the memory 217 and executing the loaded programs.

An exposure controller 215 individually controls the shutter 203. A ranging controller 216 individually controls focusing of the photographic lens 202 (focus lens). A zoom controller 221 individually controls the photographic lens 202 (zoom lens). A barrier controller 222 controls the operation of the barrier 201 as the protecting means. Note that the above-mentioned controllers other than the system controller 214 may be logical circuits exclusively designed, respectively, programmed processors, or a function block realized by the system controller 214 executing the control programs stored in the nonvolatile memory 223. Further, each controller outputs information indicating the state of its control object to the system controller 214. For example, the zoom controller 221 outputs zoom information indicating the zoom position to the system controller 214.

Further, the system controller 214 controls the exposure controller 215, the ranging controller 216, and so forth, based on calculation results acquired by the image processor 212 using image data. With the above-described control, image capture-related processing operations, such as auto focus (AF) processing, auto exposure (AE) processing, flash preliminary light emission (EF) processing, face detection processing, and personal authentication processing, are executed.

The display section 220 displays a layer combined by a layer combining section 219. By sequentially displaying captured image data on the display section 220, an electronic viewfinder function for displaying a live view image can be realized. The signal output section 241 converts image data to video signals and delivers the video signals to an external display device.

The shutter button 224, the operation section 226, and the moving image-photographing button 230 are operation means used by a user to input various instructions to the system controller 214.

A shutter switch 224a generates a first shutter switch signal SW1 when turned on by halfway-operation, i.e. so-called half-depression of the shutter button 224 (photographing preparation instruction). With the first shutter switch signal SW1, the start of photographing preparation processing operations, such as the auto focus (AF) processing, the auto exposure (AE) processing, auto white balance (AWB) processing, and the flash preliminary light emission (EF) processing, is instructed to the system controller 214.

A shutter switch 224b generates a second shutter switch signal SW2 when turned on by complete operation, i.e. so-called full-depression of the shutter button 224 (photographing instruction). With the second shutter switch signal SW2, the start of a series of photographing processing operations is instructed to the system controller 214.

The series of photographing processing operations include the following processing operations:

exposure processing and signal readout processing on the image capture device 204 processing performed by the analog-to-digital converter 205 for converting the read signals from analog to digital processing performed by the memory controller 213 for writing image data into the memory 217 development processing and compression processing performed by the image processor 212, etc.

processing for writing image data into the external storage medium 229 via the card controller 227

The operation section 226 has the following operation members, for example:

the power button the menu button the mode switching switch for switching between a photographing mode, a reproduction mode, other special photographing modes the cross key a set button a macro button a multi-screen reproduction page-break button a flash setting button a single-shooting/continuous shooting/self-timer switching button a menu move +(plus) button a menu move –(minus) button a reproduced image move +(plus) button a reproduced image move –(minus) button a photographing image quality selection button an exposure correction button a date/time setting button A power supply section 80 is formed by a primary battery, such as an alkaline battery or a lithium battery, or a secondary battery, such as an NiCd battery, an NiMH battery, or an Li battery, and an AC adapter, etc. A power supply controller 228 is comprised of a battery detection circuit, a DC-DC converter, a switch circuit for switching a block to be energized, etc., and executes detection of whether or not a battery is attached, a type of the battery, and a battery remaining amount.

A gyro section 240 detects angular speeds of the digital camera 200 in a pitch direction and a yaw direction, and outputs the detected speeds to the system controller 214 as the gyro information. A rotational angle detection section 242 detects a rotational angle of the digital camera 200, and outputs the detected angle to the system controller 214 as the rotational angle information.

Figure 3:
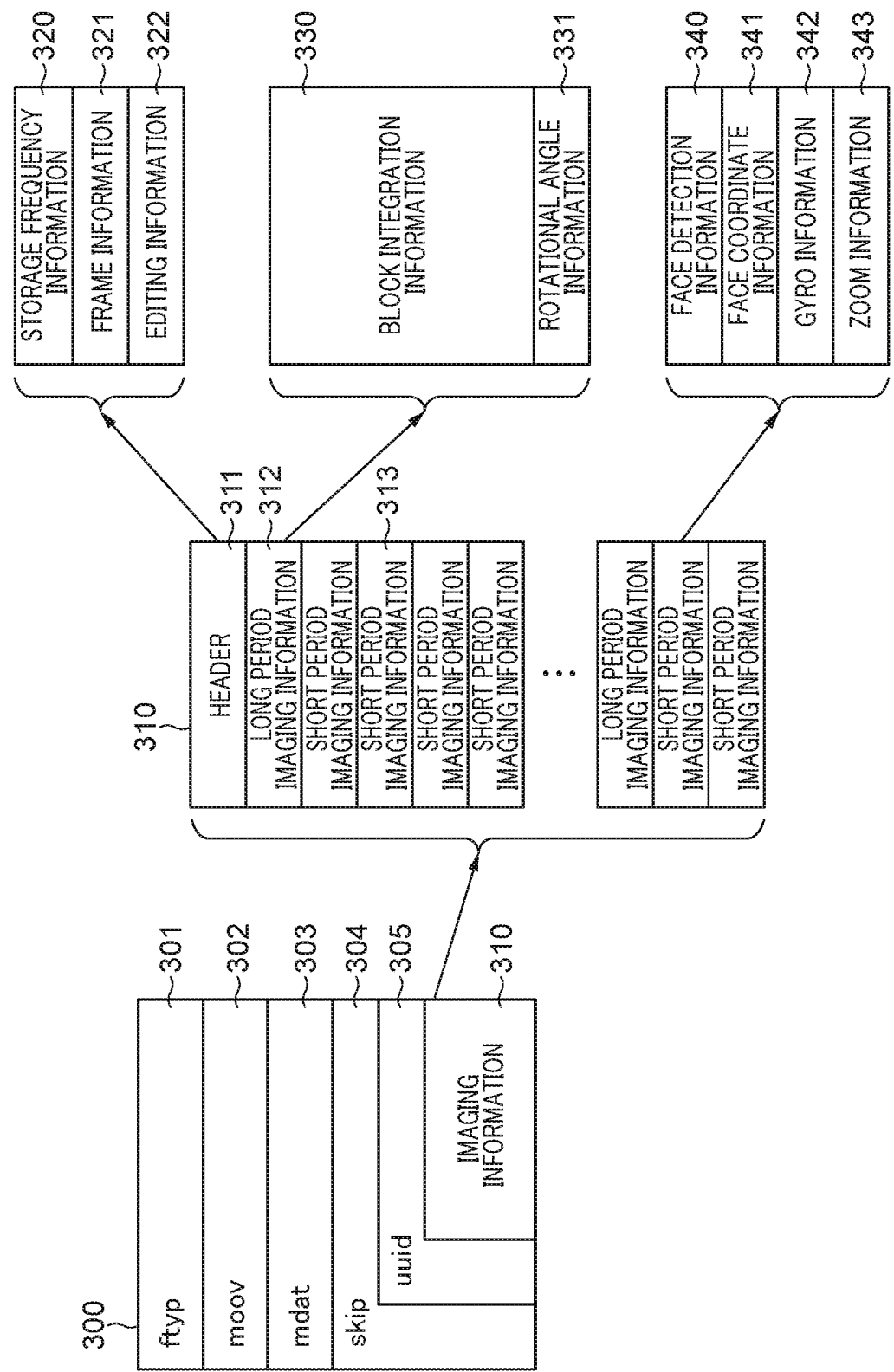
FIG. 3 is a diagram showing a file structure of a moving image file used by the digital camera.

FIG. 3 shows a file structure of a moving image file 300 according to the embodiment of the present invention. The moving image file 300 conforms to a predetermined file format, such as a MP4 container file format. The moving image file 300 includes a ftyp box 301, a moov box 302, a mdat box 303, a skip box 304, and a uuid box 305.

The ftyp box 301 is an area storing compatibility information (brand information) for identifying a file format (conforming standard) and is positioned at the top of the plurality of boxes. The moov box 302 is an area storing management information (meta data) indicating a storage state of a plurality of images forming a moving image in the moving image file 300, and can include a plurality of child boxes, such as a mvhd box. The management information includes address information indicating a frame size and a data storage location of encoded data. The mdat box 303 is an area storing encoded moving image data itself in units of frames in time series. The mdat box 303 may further include voice data. The skip box 304 is an area in which desired data can be stored and includes the uuid box 305. Note that the uuid box 305 may be included in the moov box 302.

The uuid box 305 is an area storing unique information, and includes a imaging information box 310 storing imaging information (object information, block integration information, camera operation information, etc.) PI, which is acquired when a moving image is photographed and is associated with the photographed moving image. The imaging information box 310 includes a header part 311, a long period imaging information part 312, and a short period imaging information part 313. The long period imaging information part 312 stores long period imaging information LT which is information recorded at a period (second period) of every n frames (n represents an integer of 2 or more, e.g.

n=15) of a moving image. The short period imaging information part 313 stores short period imaging information ST which is information recorded at a period (first period) of every one frame of a moving image. As shown in FIG. 3, one item of the long period imaging information LT and n items of the short period imaging information ST are treated as one set, and hence these information items are stored in the imaging information box 310 in a fixed order.

Header information HI is information required when using the imaging information PI, and includes storage frequency information 320, frame information 321, and editing information 322. The storage frequency information 320 is information indicating how many frames of a moving image are stored in the mdat box 303 each time the long period imaging information LT is stored (frequency value n, which is an integer of 2 or more), and is for example, "15". The frame information 321 includes frame number information indicating the number of frames for which the long period imaging information LT and the short period imaging information ST are stored. The editing information 322 is information stored when a moving image in the mdat box 303 is recorded or edited, and details thereof will be described hereinafter.

The long period imaging information LT includes block integration information 330 and rotational angle information 331 which are acquired at every n frames of a moving image as the imaging information PI.

The short period imaging information ST includes face detection information 340, face coordinate information 341, gyro information 342, and zoom information 343, which are acquired at every one frame of the moving image as the imaging information PI.

The information amount (data volume) of one unit of the long period imaging information LT is larger than the information amount of one unit of the short period imaging information ST.

Figure 4:
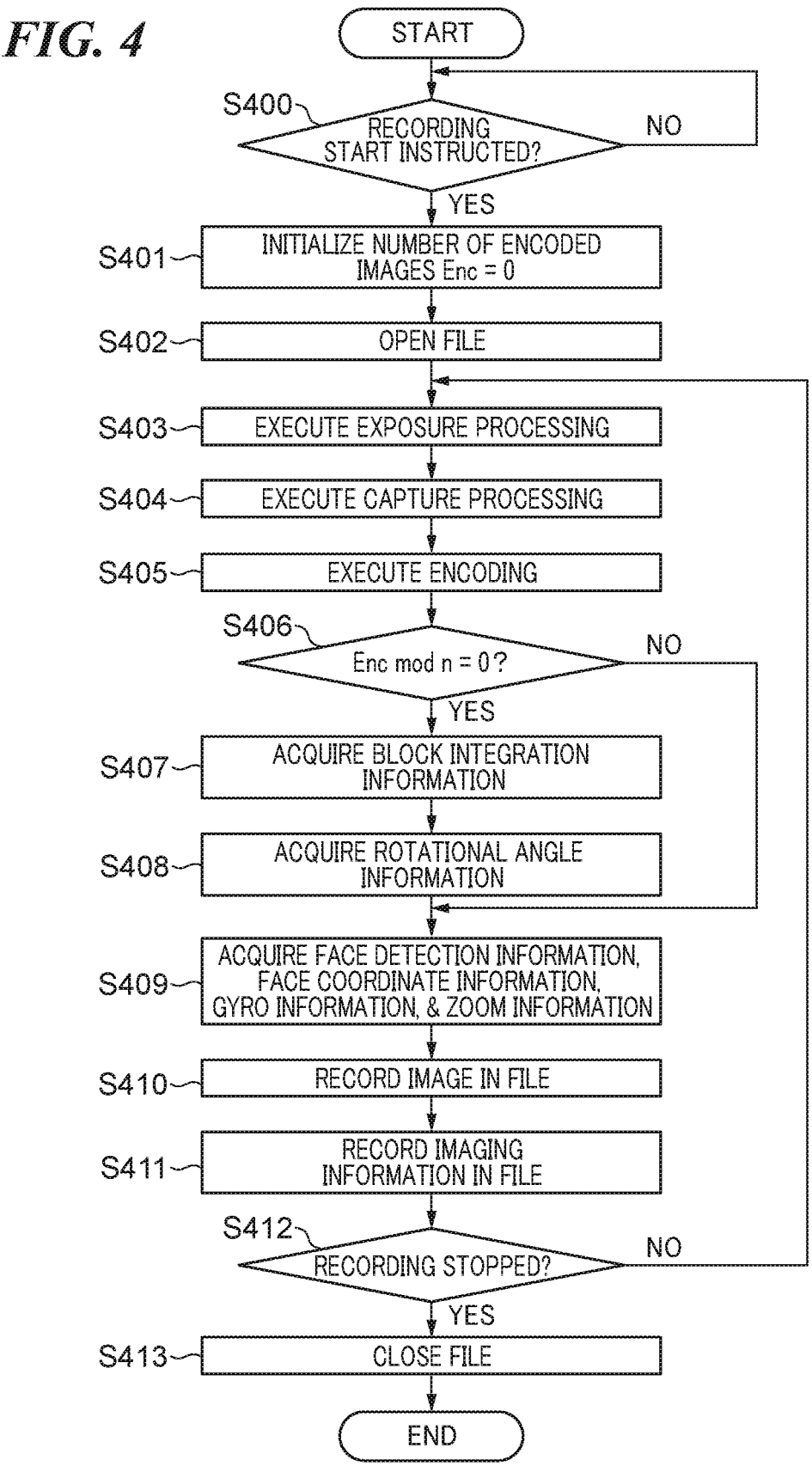
FIG. 4 is a flowchart of a moving image recording process performed by the digital camera.

FIG. 4 is a flowchart of a moving image recording process performed by the digital camera 200 according to the embodiment of the present invention. In outline, the imaging information PI is recorded in the moving image file 300 together with the moving image.

In a step S400, the system controller 214 determines whether or not the moving image-photographing button 230 has been pressed. If the moving image-photographing button 230 has not been pressed (NO to the step S400), the system controller 214 repeats the step S400. That is, the step S400 is a loop of waiting for the operation of pressing the moving image-photographing button 230. If the moving image-photographing button 230 has been pressed (YES to the step S400), the system controller 214 proceeds to a step S401.

In the step S401, the system controller 214 initializes a variable Enc indicating the number of images encoded and recorded in the moving image file 300 to "0" (Enc=0). The variable Enc is a counter of the number of images (i.e. the number of frames).

In a step S402, the system controller 214 executes open processing for making the moving image file 300 writable in which a plurality of images forming a moving image are to be recorded, for the external storage medium 229.

In a step S403, the system controller 214 controls the image capture device 204 to execute exposure processing for acquiring a captured image.

In a step S404, the system controller 214 executes capture processing of signals output from the image capture device 204 and stores the captured image data (frame) in the memory 217 via the image processor 212. The image processor 212 acquires the face detection information 340, the face coordinate information 341, and the block integration information 330, by executing the face detection processing and luminance integration information acquisition processing on the image data supplied from the system controller 214, and stores the acquired information in the memory 217.

In a step S405, the system controller 214 causes the image processor 212 to read the image data stored in the memory 217 in the step S404. The image processor 212 encodes the loaded image data according to the H.264 method.

In a step S406, the system controller 214 determines whether or not the variable Enc indicating the number of recorded images is a multiple of the frequency value n (e.g. "15") (whether or not a remainder of division of Enc by n is equal to 0) (Enc mod n=0). If the variable Enc is a multiple of the frequency value n, the system controller 214 proceeds to a step S407, whereas if not, the system controller 214 proceeds to a step S409. That is, the step S406 is a step for determining whether or not the current frame is a frame for which the long period imaging information LT is to be recorded.

In the step S407, the system controller 214 acquires the block integration information 330 stored in the memory 217 by the image processor 212 in the step S404.

In a step S408, the system controller 214 acquires the rotational angle information 331 indicating the rotational direction of the digital camera 200, which is output from the rotational angle detection section 242.

As described above, in the case where the current frame is a frame for which the long period imaging information LT is to be recorded, the steps S407 and S408 are executed to thereby acquire the block integration information 330 and the rotational angle information 331, which are required for the long period imaging information LT.

In the step S409, the system controller 214 acquires the face detection information 340 and the face coordinate information 341 stored in the memory 217 by the image processor 212 in the step S404. Further, the system controller 214 acquires the gyro information 342 indicating the angular speeds of the digital camera 200 output from the gyro section 240, and the zoom information 343 indicating the zoom position of the image capture system (zoom lens) output from the zoom controller 221. The step S409 is executed for all frames.

In a step S410, the system controller 214 records the image data captured and stored in the memory 217, in the moving image file 300 (mdat box 303) in the external recoding medium 229.

In a step S411, the system controller 214 records the imaging information PI acquired in the steps S407 to S409, in the moving image file 300 (imaging information box 310) stored in the external recoding medium 229.

In a step S412, the system controller 214 determines whether or not recording of the moving image has been stopped. If recording of the moving image has not been stopped (NO to the step S412), the system controller 214 increments the variable Enc (Enc++) and returns to the step S403 to continue recording. That is, the steps S403 to S412 are repeated for each frame. On the other hand, if recording has been stopped (YES to the step S412), the system controller 214 proceeds to a step S413.

In the step S413, the system controller 214 executes close processing for terminating writing of image data into the moving image file 300 opened in the step S402, for the external storage medium 229. In the close processing, the system controller 214 stores the storage frequency information 320, the frame information 321, and the editing information 322, in the header part 311 of the imaging information box 310. In the present example, as described above, the storage frequency information 320 is the frequency value n (e.g. "15"), and the frame number information included in the frame information 321 is "Enc". Further, the editing information 322 is a flag value (e.g. "0") indicating the normal configuration.

Figure 5A:
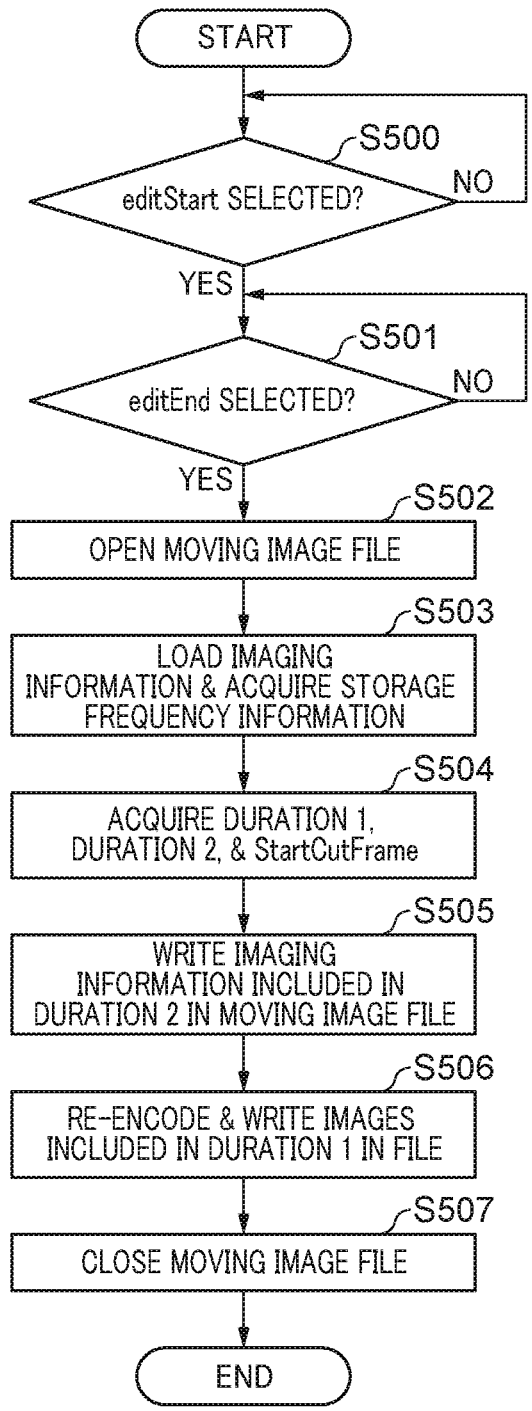
FIGS. 5A and 5B are flowcharts of a first editing process and an analysis process performed on a moving image file by the digital camera.

FIG. 5A is a flowchart of a first editing process performed by the digital camera 200 according to the embodiment, for editing the moving image file 300. In outline, a partial range of the moving image file 300, designated e.g. by a user operation, is extracted (trimmed).

Figure 6A:
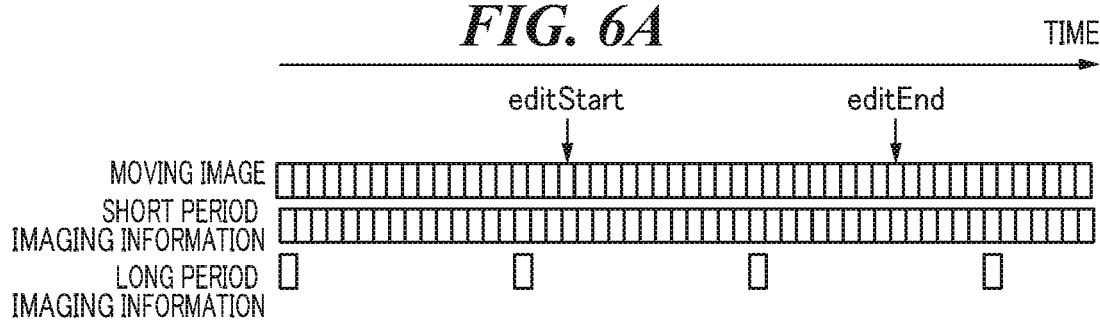
FIGS. 6A to 6D are diagrams useful in explaining time-series correspondence between an image and imaging information in the first editing process.

In a step S500, the system controller 214 determines whether or not editStart which is an editing start time point has been selected by a user operation input to the operation section 226. As shown in FIG. 6A, editStart indicates the first frame included in a range of the moving image file 300 on which the user intends to perform moving image editing. If editStart has not been selected (NO to the step S500), the system controller 214 repeats the waiting loop of the step S500, whereas if editStart has been selected (YES to the step S500), the system controller 214 proceeds to a step S501.

In the step S501, the system controller 214 determines whether or not editEnd which is an editing end time point has been selected by a user operation input to the operation section 226. As shown in FIG. 6A, editEnd indicates the last frame included in the range of the moving image file 300 on which the user intends to perform moving image editing. If editEnd has not been selected (NO to the step S501), the system controller 214 repeats the waiting loop of the step S501, whereas if editEnd has been selected (YES to the step S501), the system controller 214 proceeds to a step S502.

Note that the system controller 214 may proceed to the step S502 after the steps S500 and S501 are executed in parallel and the answers to the questions of these steps become both positive (YES). In any case, the system controller 214 functions as selection means for causing a user to select a range of frames to be edited, in the steps S500 and S501.

In the step S502, the system controller 214 executes open processing for the moving image file 300 to be edited which is recorded in the external storage medium 229.

In a step S503, the system controller 214 loads the imaging information PI, included in the moving image file 300 (imaging information box 310), which has been opened, into the memory 217, and acquires the storage frequency information 320. In the present flow, as mentioned above by way of example, it is assumed that the storage frequency information 320 indicates "15".

In a step S504, the system controller 214 acquires a time period duration 1 (first time period), a time period duration 2 (second time period), and StartCutFrame (offset value), as described hereinafter.

Figure 6B:
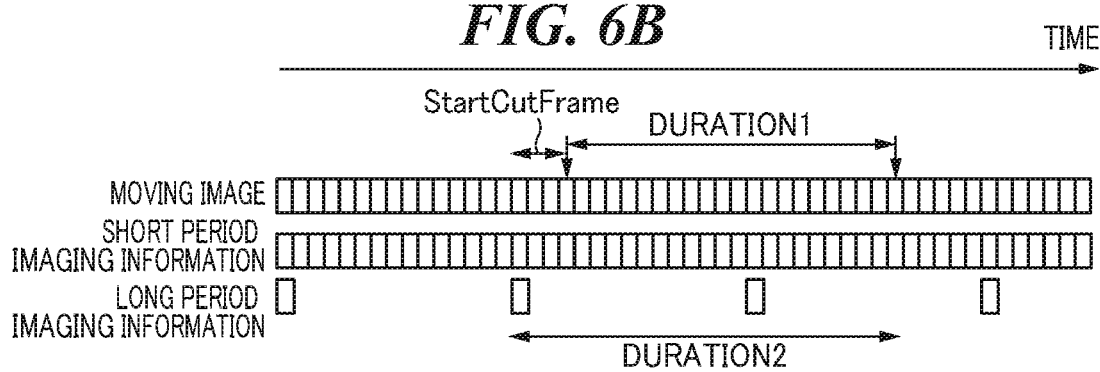

As shown in FIG. 6A, images (frames) and items of the short period imaging information ST included in the moving image file 300 are arranged in time series, respectively, in one-to-one correspondence with each other, and one long period imaging information LT is arranged for every n (15) items of the short period imaging information ST. Further, as shown in FIG. 6B, the time period duration 1 is a time period from editStart as the start time point to editEnd as the end time point, which corresponds to a moving image extracted (trimmed) from the original moving image and left in the moving image file 300 having been edited. Hereafter, the frames forming the moving image included in the time period duration 1 as the editing time period are sometimes referred to as the "extracted frames (extracted images)".

Further, the time period duration 1 corresponds to the range of frames to be edited. A value of StartCutFrame is a value (offset value) indicating the position of the long period imaging information LT (first frame), which is before the time period duration 1 (before the first time period and before editStart) and is closest to editStart. In the present example, the long period imaging information LT is positioned three frames before the start frame of the time period duration 1 and hence the value of StartCutFrame is "3". The value of StartCutFrame also indicates a difference between the start time point of the time period duration 1 and the start time point (first frame) of the time period duration 2. Note that in a case where the long period imaging information LT is positioned at the start time point of the time period duration 1, the value of StartCutFrame is "0". The time period duration 2 is a time period from a time point corresponding to the long period imaging information LT, indicated by StarCutFrame, as a start time point, to editEnd as an end time point, which corresponds to the imaging information PI left in the moving image file 300 having been edited. That is, the time period duration 2 is a time period including the imaging information PI (the short period imaging information ST and the long period imaging information LT) necessary for the moving image (a plurality of frames) in the time period duration 1.

In a step S505, the system controller 214 extracts the imaging information PI (the short period imaging information ST and the long period imaging information LT) corresponding to the time period duration 2, from the imaging information PI loaded into the memory 217, and writes the extracted information into the moving image file 300. Further, the system controller 214 writes the number of frames included in the time period duration 2 as the frame number information, and writes the value of StartCutFrame as the offset value in the frame information 321 of the moving image file 300. The time period duration 2 is stored in the moving image file 300 as an analysis time period AnalyzeDuration.

In a step S506, the system controller 214 re-encodes the moving image (extracted frames) corresponding to the time period duration 1 and sequentially writes the encoded image into the mdat box 303 of the moving image file 300. The time period duration 1 is stored in the moving image file 300 as a reproduction time period PlayDuration.

In a step S507, the system controller 214 executes close processing on the moving image file 300 which has been opened. After execution of the close processing, the process of the present flow is terminated.

Figure 6C:
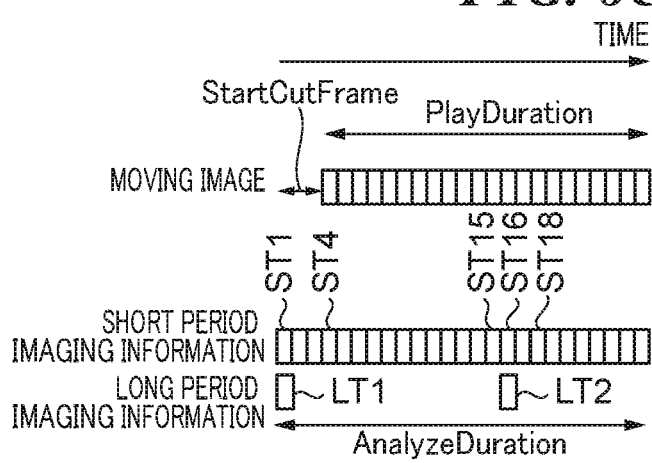

FIG. 6C shows a time-series structure of the moving image file 300 obtained by the editing process in the above-described steps S500 to S507. As shown in FIG. 6C, the image frames corresponding to the reproduction time period PlayDuration (duration 1) and the imaging information PI (the short period imaging information ST and the long period imaging information LT) corresponding to the analysis time period AnalyzeDuration (duration 2) are left in the moving image file 300 having been edited.

In the editing process, by setting StartCutFrame and the time period duration 2 (analysis time period AnalyzeDuration) as described above, it is possible to make the edited moving image file 300 conforming to a format adapted to an analysis process, described hereinafter. This will be more specifically described as follows: Assuming only the imaging information PI within the time period duration 1 (i.e. after editStart) is left in the moving image file 300 having been edited, a frame without the long period imaging information LT corresponding thereto (before editStart) is generated. In this case, it is difficult to execute a process requiring the long period imaging information LT (e.g. a highlight analysis process, described hereinafter) with respect to the frames without the long period imaging information LT corresponding thereto. In the present example, StartCutFrame indicating the time-series position of the long period imaging information LT is set in the editing process, whereby the long period imaging information items LT corresponding to all frames (extracted frames) in the edited moving image file 300, are stored therein. Therefore, it is possible to execute the process requiring the long period imaging information LT from the top of the extracted frames of the moving image file 300 having been edited as described above.

Particularly, in the imaging information box 310 (see FIG. 3) of the present embodiment having the data structure in which the long period imaging information part 312 and the short period imaging information part 313 are stored in the fixed order, unless the above-described setting is performed, the following problem is caused: As shown in FIG. 6C, originally, long period imaging information LT1 corresponds to 15 items of the short period imaging information ST, starting from short period imaging information ST1, and the long period imaging information LT2 corresponds to 15 items of the short period imaging information ST, starting from the short period imaging information ST16. However, the long period imaging information LT1 is not included in the time period duration 1 (reproduction time period PlayDuration), and further, the short period imaging information ST starts from the short period imaging information ST4, different from the start time point (short period imaging information ST1) of the long period imaging information LT1. As shown in FIG. 3, since the data structure of the imaging information box 310 is fixed, one long period imaging information LT and 15 items of the short period imaging information ST are sequentially stored. Therefore, in a case where only the imaging information PI within the time period duration 1 is left in the moving image file 300 having been edited, the one long period imaging information LT2 and 15 items of the short period imaging information ST4 to ST18 (see FIG. 6C) are sequentially stored in the imaging information box 310 as one set. In other words, the one long period imaging information LT2 and 15 items of the short period imaging information ST4 to ST18 are sequentially stored in the imaging information box 310 in a state in which the initial order (correspondence relation) is changed. That is, in the case where only the imaging information PI within the time period duration 1 (first time period) is left in the moving image file 300 having been edited, a problem is caused, that the time-series arrangement (correspondence relation) of the long period imaging information LT and the short period imaging information ST is changed before and after editing. According to the editing process, described with reference to FIG. 5A, the long period imaging information LT and the short period imaging information ST are stored in the moving image file 300 having been edited in a state in which the time-series order (correspondence relation) before editing is maintained. In other words, according to the editing process, described with reference to FIG. 5A, the start time point of the long period imaging information LT and the start time point of the short period imaging information ST coincide with each other in the moving image file 300 having been edited. As a result, the analysis process using the long period imaging information LT and the short period imaging information ST can be properly executed also for the moving image file 300 having been edited.

Figure 5B:
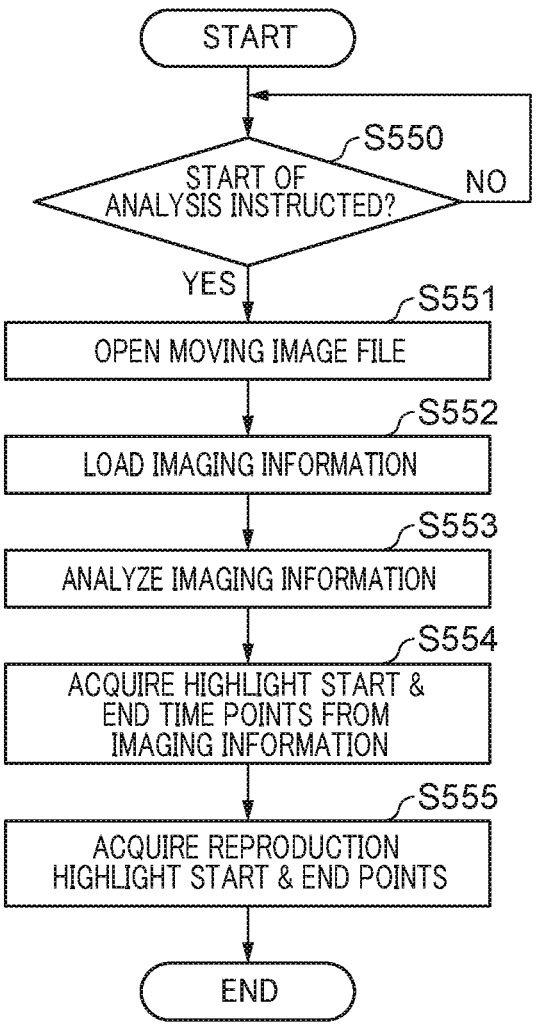

FIG. 5B is a flowchart of a process performed by the digital camera 200 according to the embodiment of the present invention, for analyzing the moving image file 300. In outline, a highlight time period to which attention is to be paid is identified by analyzing the moving image file 300, designated e.g. by a user operation.

In a step S550, the system controller 214 determines whether or not the start of analysis on the existing moving image file 300 has been instructed by a user operation input to the operation section 226. If the start of analysis has not been instructed (NO to the step S550), the system controller 214 repeats the step S550. That is, the step S550 is a loop for waiting for the analysis start instruction. If the start of analysis has been instructed (YES to the step S550), the system controller 214 proceeds to a step S551.

In the step S551, the system controller 214 executes open processing for the moving image file 300 to be analyzed, which is recorded in the external storage medium 229. In the present example, it is assumed the moving image file 300 shown in FIG. 6C, which was acquired by the editing process in FIG. 5A, has been selected by the user.

In a step S552, the system controller 214 loads the imaging information PI included in the moving image file 300 (imaging information box 310) having been opened, into the memory 217.

In a step S553, the system controller 214 controls the image processor 212 to execute highlight analysis processing based on the imaging information PI loaded into the memory 217. The image processor 212 acquires highlight part as part to which attention is to be paid in the moving image by analyzing the imaging information PI associated with the moving image in the moving image file 300. The image processor 212 acquires, for example, part including a face of a specific person as the highlight part based on the face detection information 340 and the face coordinate information 341. Note that by using the block integration information 330 and the rotational angle information 331 included in the long period imaging information LT in the imaging information PI, it is possible to more accurately detect the highlight part.

Figure 6D:
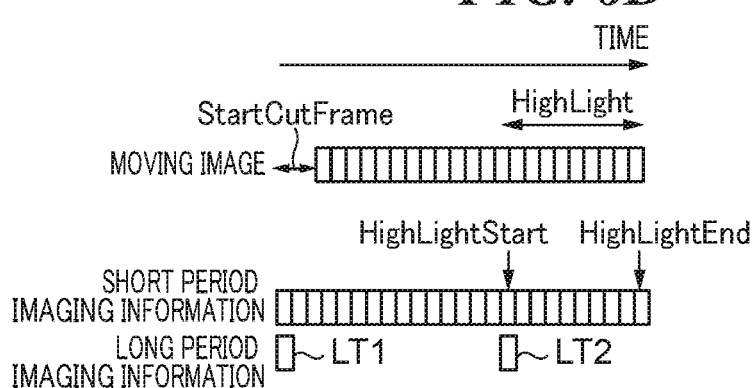

In a step S554, the system controller 214 acquires a start time point HighLightStart and an end time point HighLightEnd of a highlight time period HighLight including the highlight part according to a result of the analysis in the step S553. FIG. 6D shows an example of the highlight time period HighLight, the highlight start time point HighLightStart, and the highlight end time point HighLightEnd. As shown in FIG. 6D, the highlight start time point HighLightStart and the highlight end time point HighLightEnd are values acquired in association with the analysis time period AnalyzeDuration.

In a step S555, the system controller 214 acquires a reproduction highlight start time point PlayHighLightStart and a reproduction highlight end time point PlayHighLightEnd for reproduction, i.e. the reproduction time period PlayDuration. The reproduction highlight start time point PlayHighLightStart and the reproduction highlight end time point PlayHighLightEnd are acquired by the following equations:

$$PlayHighLightStart = HighLightStart - StartCutFrame$$

$$PlayHighLightEnd = HighLightEnd - StartCutFrame$$

The system controller 214 may store the various highlight-related parameters acquired in the steps S553 to S555, in the moving image file 300.

As described above, by using StartCutFrame indicating a difference value (offset value) between the analysis time period AnalyzeDuration and the reproduction time period PlayDuration, the highlight start time point and the highlight end time point are adjusted for reproduction.

The system controller 214 may correct, in a case where the reproduction highlight start time point PlayHighLightStart calculated in the step S555 comes before the start time point of the reproduction time period PlayDuration, the reproduction highlight start time point to the start time point of the reproduction time period.

The first editing process, described with reference to FIGS. 5A, and 6A to 6D, can be modified to the following form. A second editing process as a variation of the first editing process will be described with reference to FIGS. 7A and 7B.

The operations in the steps S500 to S504 in FIG. 5A are the same as those of the first editing process. Therefore, in the step S504 in the second editing process, the system controller 214 acquires the time period duration 1, the time period duration 2, and StartCutFrame, as described above.

The system controller 214 determines whether or not the acquired value of StartCutFrame is not smaller than a reference value (n/2, e.g. "7.5"), indicated by a quotient obtained by dividing the frequency value n (e.g. "15") by 2. Note that the reference value for the determination may be not only a real number (n/2) as mentioned above, but also an integer value obtained by rounding the real number (such as a value obtained by rounding the real number up, down, or off). That is, the reference value is a value based on the frequency value n. In a case where an integer value is used as the reference value, the information amount of the reference value is reduced, and the operation load of the determination processing based on the reference value is reduced.

If the value ("3" in FIG. 7A) of StartCutFrame is smaller than the reference value, the system controller 214 stores the long period imaging information LT1, the position of which is before the time period duration 1 (before editStart) and is closest to editStart, in the moving image file 300. The above-mentioned operation is the same as that in the step S505 in FIG. 5A. Therefore, the imaging information PI, such as the short period imaging information ST, and the extracted frames are also stored in the moving image file 300, similarly to the first editing process (steps S505 and S506).

On the other hand, if the value ("9" in FIG. 7B) of StartCutFrame is not smaller than the reference value, the system controller 214 stores the long period imaging information LT2, which is included in the time period duration 1 and comes first, in the moving image file 300. Further, the system controller 214 corrects StartCutFrame such that StartCutFrame indicates the long period imaging information LT2 in place of the long period imaging information LT1 (for example, corrects StartCutFrame from 9 to 6). The value of StartCutFrame obtained by this correction is sometimes referred to as the "corrected offset value". The system controller 214 corrects the start time point of the time period duration 2 from a frame corresponding to the long period imaging information LT1 to a frame corresponding to the long period imaging information LT2. The system controller 214 stores the short period imaging information ST included in the time period duration 2 having been corrected (corrected second time period) in the moving image file 300. The system controller 214 corrects the value of the editing information 322 to a negative flag value (e.g. "−1") indicating a configuration obtained by the above-mentioned modification (configuration in which StartCutFrame indicates the first long period imaging information LT2 in the time period duration 1). In the step S506, the system controller 214 sets the time period duration 2 to the reproduction time period PlayDuration according to the flag value indicated by the editing information 322, and stores the moving image (frames) corresponding to the time period duration 2 in the moving image file 300. Note that in the step S506, the system controller 214 may set the time period duration 1 to the reproduction time period PlayDuration similarly to the first editing process and store the moving image (frames) corresponding to the time period duration 1 in the moving image file 300. Further, the system controller 214 may cause a user to select whether to store the frames corresponding to the time period duration 1 or the frames corresponding to the time period duration 2 in the moving image file 300.

As described above, in the second editing process, the imaging information PI and the frames to be left in the moving image file 300 are corrected based on the magnitude of StartCutFrame. According to the above-described configuration, in a case where StartCutFrame is not smaller than the reference value, i.e. editStart and the long period imaging information LT are relatively more largely separated from each other, the imaging information PI and the frames to be left are reduced. As a result, similar to the first editing process, it is possible to properly execute the analysis process also in the moving image file 300 having been edited, and further, it is possible to reduce the volume of the moving image file 300 having been edited.

The first editing process, described with reference to FIGS. 5A, and 6A to 6D, can also be modified as follows. A third editing process as another variation of the first editing process will be described with reference to FIGS. 7C and 7D.

The operations in the steps S500 to S504 in FIG. 5A are the same as those of the first editing process. Therefore, in the step S504 in the third editing process, the system controller 214 acquires the time period duration 1, the time period duration 2, and StartCutFrame, as described above.

In the third editing process, by executing the steps S553 and S554 before the step S505 similarly to FIG. 5B, the highlight time period HighLight, the start time point HighLightStart. and the end time point HighLightEnd are acquired. Note that the steps S553 and S554 are not necessarily required to be executed immediately before the step S505 but may be executed at a desired timing before the step S505.

In the step S505, the system controller 214 determines whether the highlight end time period HighLightEnd is included in the time period duration 1 as the editing time period (after editStart). That is, the system controller 214 determines whether or not there exists a time period included in both of the time period duration 1 and the highlight period HighLight.

Figure 7A:
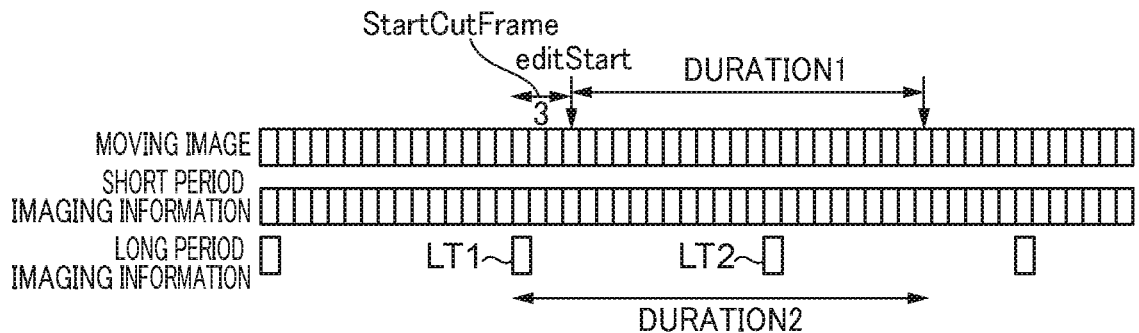
Figure 7A:
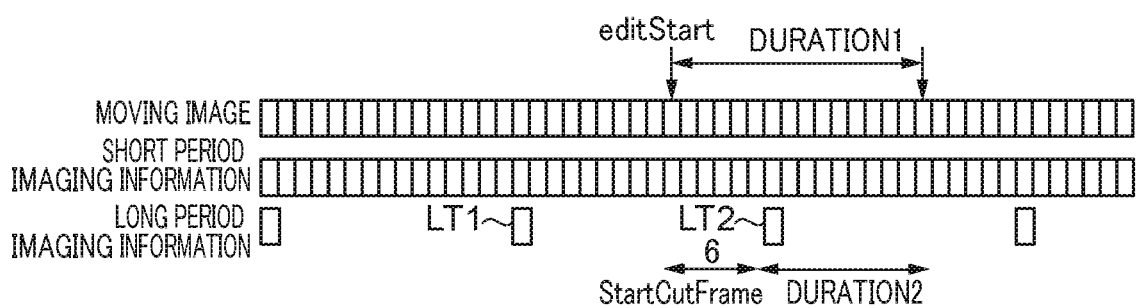
Figure 7C:
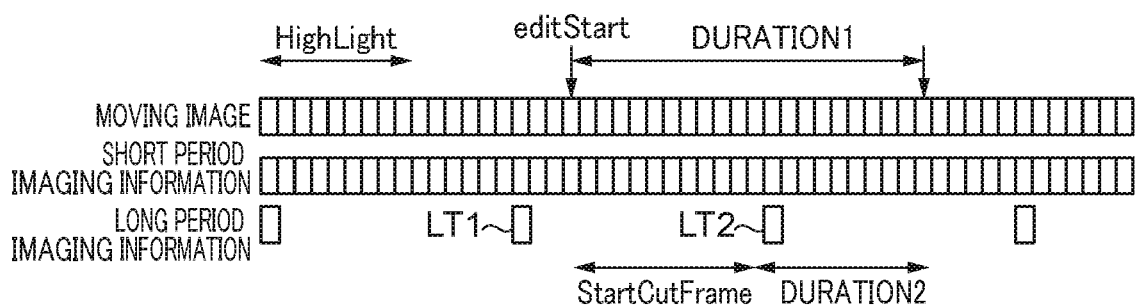

As shown in FIG. 7C, in a case where the end time point HighLightEnd of the highlight time period is before editStart (not included in the time period duration 1), the system controller 214 executes the editing process as described with reference to FIG. 7B in the second editing process. That is, the system controller 214 stores the long period imaging information LT2 which is included in the time period duration 1 and comes first, in the moving image file 300. The other information elements (StartCutFrame, the time period duration 2, the short period imaging information ST, the editing information 322, etc.) are also edited in the same manner as described with reference to FIG. 7B.

Figure 7D:
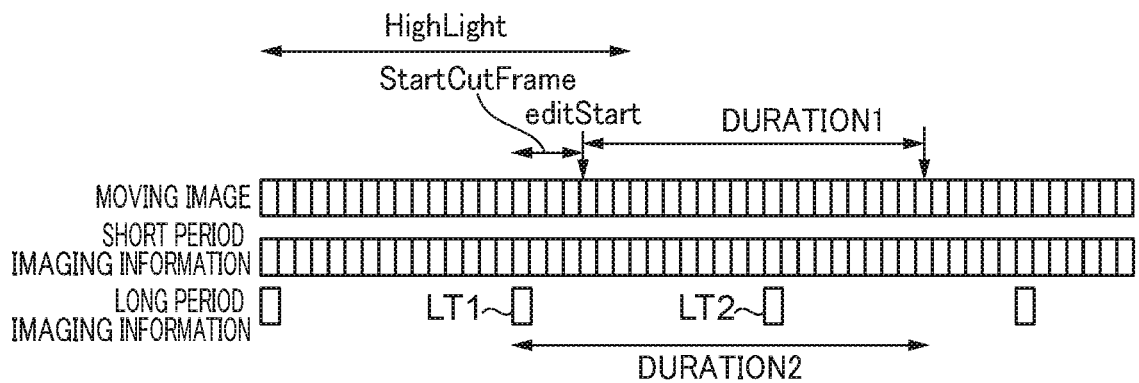

On the other hand, as shown in FIG. 7D, in a case where the end time point HighLightEnd of the highlight time period is after editStart (included in the time period duration 1), the system controller 214 executes the editing process as described with reference to FIG. 7A in the second editing process. That is, the system controller 214 stores the long period imaging information LT1, the position of which is before the time period duration 1 (before editStart) and is closest to editStart, in the moving image file 300. The other information elements (StartCutFrame, the time period duration 2, the short period imaging information ST, the editing information 322, etc.) are also edited in the same manner as described with reference to FIG. 7A. i.e. similarly to the first editing process.

As described above, in the third editing process, the imaging information PI and the frames to be left in the moving image file 300 are corrected based on the overlapping state between the time period duration 1 as the time period of the moving image to be edited and the highlight time period HighLight. With this configuration, in a case where the highlight time period HighLight ends before editStart, the imaging information PI and the frames to be left are reduced. As a result, similar to the first editing process, it is possible to properly execute the analysis process also in the moving image file 300 having been edited, and further, it is possible to reduce the volume of the moving image file 300 having been edited.

The above-described embodiment can be variously modified. Examples of the modifications will be described. Two or more modifications selected as desired from the above-described embodiment and the following examples can be combined as needed insofar as they are not inconsistent with each other.

Although in the above-described embodiment, the short period imaging information ST is recorded at every one frame, the configuration in which the short period imaging information ST is recorded at a period of a plurality of frames shorter than the period at which the long period imaging information LT is recorded can be employed. For example, the short period imaging information ST may be recorded at every two frames.

Although in the above-described embodiment, one long period imaging information LT and 15 items of the short period imaging information ST are sequentially stored in the imaging information box 310 as one set, a plurality of items of the long period imaging information LT may be included in one set. That is, p items of the long period imaging information LT recorded at the first period and q items of the short period imaging information ST recorded at the second period shorter than the first period may be sequentially stored in the imaging information box 310 as one set. Note that p is an integer of 1 or more, and q is an integer of 2 or more and is larger than p.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-058726 filed Mar. 26, 2019, which is hereby incorporated by reference herein in its entirety.

What is claimed is:

1. An image processing apparatus that executes an editing process on a moving image file in which moving image data of a plurality of frames arranged in a time series and additional information associated with the plurality of frames of the moving image data are recorded,
   wherein the additional information has a data structure in which long period frame information recorded in association with a frame at a first period among the plurality of frames and short period frame information recorded in association with a frame at a second period shorter than the first period among the plurality of frames are arranged,
   the image processing apparatus comprising:
   a controller configured to execute the editing process such that a frame associated with the long period frame information becomes a first frame in the moving image file having been edited,
   wherein the controller stores extracted images which are the plurality of frames included in a first time period from an editing start time point to an editing end time point of the moving image, an offset value indicating a difference between the start time point of the first time period and a time point corresponding to the long period frame information which is before the first time period and is closest to the editing start time point, and the long period frame information and the short period frame information which are included in a second time period from a time point corresponding to the long period frame information indicated by the offset value to the editing end time point, in the moving image having been edited, and
   wherein in a case where the offset value is not smaller than a reference value set based on a frequency value indicating the second period, the controller stores a corrected offset value corrected to indicate a difference between the start time point of the first time period and a time point corresponding to the long period frame information which is included in the first time period and comes first, and the long period frame information and the short period frame information, which are included in a corrected second time period from a time point corresponding to the long period frame information indicated by the corrected offset value to the editing end time point, in the moving image having been edited.

2. The image processing apparatus according to claim 1, wherein the second period is a one-frame period.

3. The image processing apparatus according to claim 1, wherein the long period frame information is arranged with the short period frame information in time series.

4. The image processing apparatus according to claim 1, wherein the long period frame information is information larger in information amount per one frame than the short period frame information.

5. The image processing apparatus according to claim 1, further comprising a selection unit configured to cause a user to select a range of frames as an object to be edited on which the editing process is to be executed, and wherein in a case where the first frame of the range of frames selected by the selection unit as the object to be edited is a frame without the long period frame information, the controller performs control to execute the editing process by changing such that a frame having the long period frame information becomes the first frame of the range of frames as the object to be edited.

6. The image processing apparatus according to claim 1, wherein the reference value is an integer value obtained by rounding a quotient obtained by dividing the second period by 2.

7. The image processing apparatus according to claim 1, further comprising an image processor configured to acquire highlight part by analyzing the plurality of frames included in the moving image, and wherein the controller acquires a highlight start time point and a highlight end time point which correspond to a highlight time period including the highlight part, in association with the second time period, a reproduction highlight start time point at which highlight is to be started when the moving image is reproduced, based on the highlight start time point and the offset value, and a reproduction highlight end time point at which the highlight is to be terminated when the moving image is reproduced, based on the highlight end time point and the offset value.

8. The image processing apparatus according to claim 7, wherein in a case where the reproduction highlight start time point comes before the start time point of the first time period, the controller corrects the reproduction highlight start time point to the start time point of the first time period.

9. The image processing apparatus according to claim 7, wherein in a case where the highlight end time point is before the editing start time point, the controller stores a corrected offset value corrected to indicate a difference between the start time point of the first time period and a time point corresponding to the long period frame information which is included in the first time period and comes first, and the long period frame information and the short period frame information, which are included in a corrected second time period from a time point corresponding to the long period frame information indicated by the corrected offset value to the editing end time point, in the moving image having been edited.

10. The image processing apparatus according to claim 1, wherein the long period frame information includes block integration information indicating a block luminance integrated value obtained by integrating an object luminance for each of a plurality of areas obtained by dividing the frame.

11. The image processing apparatus according to claim 1, wherein the short period frame information includes face detection information concerning a face detected from the frame.

12. The image processing apparatus according to claim 1, wherein the additional information includes p items (p is an integer of 1 or more) of the long period frame information and q items (q is an integer of 2 or more, and is larger than p) of the short period frame information.

13. An image capture apparatus comprising: an image capture device used for acquiring image data forming a plurality of frames which are included in a moving image and arranged in time series; and an image processing apparatus according to claim 1.

14. An image processing method for editing a moving image file in which moving image data of a plurality of frames arranged in a time series and additional information associated with the plurality of frames of the moving image data are recorded,
wherein the additional information has a data structure in which long period frame information recorded in association with a frame at a first period among the plurality of frames and short period frame information recorded in association with a frame at a second period shorter than the first period among the plurality of frames are arranged, the method comprising:
editing the moving image file such that a frame associated with the long period frame information becomes a first frame in the moving image file having been edited;
storing extracted images which are the plurality of frames included in a first time period from an editing start time point to an editing end time point of the moving image, an offset value indicating a difference between the start time point of the first time period and a time point corresponding to the long period frame information which is before the first time period and is closest to the editing start time point, and the long period frame information and the short period frame information which are included in a second time period from a time point corresponding to the long period frame information indicated by the offset value to the editing end time point, in the moving image having been edited; and
storing, in a case where the offset value is not smaller than a reference value set based on a frequency value indicating the second period, a corrected offset value corrected to indicate a difference between the start time point of the first time period and a time point corresponding to the long period frame information which is included in the first time period and comes first, and the long period frame information and the short period frame information, which are included in a corrected second time period from a time point corresponding to the long period frame information indicated by the corrected offset value to the editing end time point, in the moving image having been edited.

15. A non-transitory computer-readable storage medium storing a computer-executable program for executing an image processing method for editing a moving image file in which moving image data of a plurality of frames arranged in a time series and additional information associated with the plurality of frames of the moving image data are recorded,
wherein the additional information has a data structure in which long period frame information recorded in association with a frame at a first period among the plurality of frames and short period frame information recorded in association with a frame at a second period shorter than the first period among the plurality of frames are arranged, wherein the method comprises:

editing the moving image file such that a frame associated with the long period frame information becomes a first frame in the moving image file having been edited;

storing extracted images which are the plurality of frames included in a first time period from an editing start time point to an editing end time point of the moving image, an offset value indicating a difference between the start time point of the first time period and a time point corresponding to the long period frame information which is before the first time period and is closest to the editing start time point, and the long period frame information and the short period frame information which are included in a second time period from a time point corresponding to the long period frame information indicated by the offset value to the editing end time point, in the moving image having been edited; and storing, in a case where the offset value is not smaller than a reference value set based on a frequency value indicating the second period, a corrected offset value corrected to indicate a difference between the start time point of the first time period and a time point corresponding to the long period frame information which is included in the first time period and comes first, and the long period frame information and the short period frame information, which are included in a corrected second time period from a time point corresponding to the long period frame information indicated by the corrected offset value to the editing end time point, in the moving image having been edited.

* * * * *